United States Patent [19]

Sigwardt

[11] Patent Number: 4,512,187

[45] Date of Patent: Apr. 23, 1985

[54] FLOW RATE CONTROLLER

[75] Inventor: Peter L. Sigwardt, Houston, Tex.

[73] Assignee: Getty Oil Company, Houston, Tex.

[21] Appl. No.: 322,729

[22] Filed: Nov. 19, 1981

[51] Int. Cl.³ .............................................. G01F 3/02
[52] U.S. Cl. ...................... 73/198; 73/239;
73/262; 166/75 R; 166/275; 222/275; 222/1;
222/386.5
[58] Field of Search ............... 222/249, 250, 14, 15,
222/16, 36, 37, 52, 71, 73, 334, 1, 386.5;
417/342; 92/144; 73/198, 239, 262; 166/75 P,
275

[56] References Cited

U.S. PATENT DOCUMENTS

| 17,654 | 6/1857 | Niles ...................... 73/239 |
| Re. 26,820 | 3/1970 | Bennett ...................... 417/342 X |
| 71,865 | 12/1867 | Fitzgerald . | |
| 245,310 | 8/1881 | Morison ...................... 73/239 X |
| 1,377,654 | 10/1921 | Baumgardner ...................... 417/347 |
| 1,777,293 | 10/1930 | Curtis et al. ...................... 222/250 X |
| 2,006,181 | 6/1935 | Reswick ...................... 222/249 X |
| 2,525,295 | 10/1950 | Harrington ...................... 222/250 X |
| 2,690,715 | 10/1954 | Pope ...................... 417/342 |
| 2,819,679 | 1/1958 | Wilson ...................... 222/249 X |
| 3,216,627 | 9/1965 | Best et al. . | |
| 3,223,291 | 12/1965 | Thomas ...................... 222/249 |
| 3,362,618 | 1/1968 | Fortinov ...................... 92/144 X |
| 3,477,380 | 11/1969 | Johanson et al. . | |
| 3,778,193 | 11/1973 | Reinert ...................... 417/342 |
| 3,913,787 | 10/1975 | Dilger ...................... 222/249 X |
| 4,065,230 | 12/1977 | Gezari ...................... 417/342 X |
| 4,103,490 | 8/1978 | Gorlov ...................... 417/347 X |
| 4,269,569 | 5/1981 | Hoover ...................... 417/347 X |

FOREIGN PATENT DOCUMENTS

| 369209 | of 1932 | United Kingdom ........... 417/341 X |
| 1034763 | 7/1966 | United Kingdom . |
| 1228776 | 4/1971 | United Kingdom ............... 222/249 |
| 1305729 | 2/1973 | United Kingdom ............... 222/250 |

Primary Examiner—H. Grant Skaggs
Attorney, Agent, or Firm—Jack H. Park; Edmund F. Bard; D. Arlon Groves

[57] ABSTRACT

Flow control of a shear-sensitive, i.e. pressure gradient degradable, liquid from a high pressure source to a lower pressure discharge is achieved by controlling the liquid's exposure to a degradation pressure gradient. Two displacement chambers are provided and connected by a control conduit. First and second movable barriers in the first and second chambers respectively contain a separate controlling liquid. A pressure and flow control valve is included in the control conduit. Incoming pressurized controlled shear-sensitive liquid flows into the first displacement chamber to displace the first barrier which displaces controlling liquid through the flow control valve. Shear-sensitive liquid is dispensed at relatively lower pressure from the second chamber in response to movement of the second barrier driven by the controlling fluid coming from the control conduit into the second chamber. The flow of controlled liquid to and from the chambers is selectively reversed to provide for continuous pumping from the high pressure source to the low pressure discharge. Indication of total flow and rate of flow of the controlled liquid through the discharge conduit may also be indicated. The flow control valve is adjusted to establish the pressure drop imposed on the controlling liquid and thereby the pressure drop in the controlled liquid without subjecting the controlled fluid to a degradation pressure gradient.

16 Claims, 7 Drawing Figures

FLOW RATE CONTROLLER

BACKGROUND OF THE INVENTION

This invention relates to the field of fluid flow rate control and metering, and more particularly, relates to flow rate control and metering of shear sensitive liquids.

Polymer solutions are probably the most commonly used shear sensitive liquids. Some liquids such as polyacrylamide solutions which are used in oil well drilling and in supplemental oil recovery operations are highly sensitive to the effects of shear. Many other liquids are also subject to substantial deterioration of shear degradation, for example, CMC (carboxymethyl-cellulose) solutions used in oil well drilling and in the food industry, latex polymers used in the manufacture of paints, solutions of biopolymers such as guar gum and polysaccharides used as flooding agents in supplemental oil recovery, some lubricating oils, and some lotions and salves used in cosmetics.

Shear sensitive polymer solutions are frequently used in chemical processes and in various phases of oil production to provide a liquid having desired high viscosity properties. For instance, during certain types of secondary and tertiary recovery of oil, a polymer solution such as polyacrylamide, is injected through the input wells, as a flooding agent, to displace oil trapped in the adjacent geological formation. High viscosity polymer solutions tend to flow in a cohesive manner, that is, the volume of polymer solution tends to flow uniformly through the geological formation thereby avoiding separate and independent channeling of polymer solution through the geological formation. Accordingly, flooding with high viscosity polymer fluids is often used to enhance oil recovery by displacing a generally larger portion of trapped oil than would otherwise be displaced by a liquid having a relatively lower viscosity.

Currently, polymer solutions are pumped to input wells by one or more large positive displacement pumps. Supply pressure at each input well may be as high as 2500 psig, however, the required discharge pressure into the input well may be as low as 0 psig, depending upon formation pressure and the desired flow rate of the polymer solution. If the polymer solution is shear sensitive, it is necessary to provide adequate means for flow rate control with a high pressure drop and without causing viscosity degradation of the liquid. It is also desirable to provide adequate means for flow rate metering at or near each input well.

Typically, shear stressing is caused by a high pressure gradient which may be directly imposed upon a liquid by conventional flow controlling means or by conventional turbine metering means. Unfortunately, shear stressing damages shear-sensitive polymer solutions by a phenomenon known as physical (shear) degradation. Significant shear degradation will occur in such liquids with any substantial reduction in pressure through conventional flow control means. The pressure drop across a valve or flow control means, which will be considered herein to result in a substantial or significant pressure differential, will vary depending upon the composition of the shear-sensitive liquid, the flow rate through the valve, and other variables. Nevertheless, for most shear-sensitive liquids, a pressure differential of about 50 psi across a valve member is a substantial pressure drop resulting in significant degradation of the liquid. Thus a pressure differential of about 50 psi is considered to be a substantial pressure differential with respect to the shear sensitive liquids referred to herein.

Physical degradation of shear-sensitive polymer solutions used for secondary and tertiary oil recovery operations is very undesirable because it generally causes a dramatic decrease in polymer solution viscosity. As previously mentioned, a suitable secondary and tertiary oil recovery flooding agent should have high viscosity. However, loss of viscosity of polymer solutions caused by conventional flow rate controlling means and conventional turbine metering means is often so great that the effectiveness of the polymer solution as a flooding agent is diminished or even destroyed.

For example, a throttle valve shear test was conducted using a conventional orifice-type throttle valve and an 800 ppm concentration polyacrylamide polymer solution. The pressure of the solution of the high-pressure side of the throttle valve was held substantially at 2300 psig while the solution flow rate was varied by adjusting the throttle valve. Approximately 50% of the solution viscosity was permanently lost when the solution was subjected to a 600 psig pressure drop across the throttle valve.

Because of the shear degradation problem, conventional means for controlling high-pressure drop flow rate, such as conventional orifice-type throttle valves or flow rate control valves (adapted to maintain constant flow with variable pressure drop across the valve), and conventional means for metering flow rate, such as in-line turbine meters, are unsatisfactory for service of polymer solutions for various uses requiring high viscosity liquids. They are clearly unsatisfactory at the well head during secondary and tertiary oil recovery operations because they can cause substantial shear stressing of the polymer solutions.

It has been suggested that a polymer solution be used that has a polymer concentration high enough to compensate for the polymer viscosity loss caused by conventional flow rate control valves. However, in a 600 psig pressure drop similar to the aforementioned example, roughly 30% more polymer would be required to maintain a 60 cp solution, rather than a 30 cp solution. Currently, such an approach is quite costly and, therefore, undesirable.

Accordingly, there is need of an apparatus and a method for substantially reducing the pressure of a liquid and for controlling and metering the flow rate thereof without causing significant shear stresses on the liquid. For various reasons, however, prior art attempts to provide such an apparatus have proved to be inadequate and/or very expensive.

Some of the prior art flow rate control devices which have been developed to avoid damaging polymer solutions are cumbersome, requiring piping disassembly or component replacement to adjust flow rate.

An example of such a device utilizes a plurality of copper tubing coils. Copper tubing of various lengths and internal diameters are fashioned as coils. The coils are manifolded in series with the flowline between the pump and the input wellhead so that polymer solution must pass through the coils. A low gradient pressure drop is imposed upon the polymer solution by passing it through the coils, thereby avoiding high shear stresses which would otherwise damage the solution.

This copper tubing device is expensive. Moreover, the pressure differential across and the flow rate through the coils of this device may be controlled solely by varying the combination of length and internal diameter of copper tubing used, which is usually accomplished by changing the coils. Proper coil sizing is dependent upon other variables such as solution pressure upstream and downstream from the coils and the viscosity of the solution. Of course, changing the coils is inconvenient and time consuming and interrupts the flow of solution to the input wellhead so that substantial slowing of the recovery operation due to repeated coil replacement is likely if there is significant fluctuation of the aforementioned variables.

Another polymer solution rate control device comprises a particular length of flowline section packed with spherical glass beads which provide a low gradient pressure drop as the solution flows past the glass beads. However, in addition to the problem of repeated replacement caused by the device's flow rate dependency upon upstream and downstream pressure and solution viscosity, sizing of the device must be determined experimentally, thus further slowing the recovery operation.

A more complete description of these devices may be found in:

"Operational Problems in North Burbank Unit Surfactant/Polymer Project", Journal of Petroleum Technology, (January, 1980), pp. 11–17; "Micellar-Polymer Injection System Has Special Features", The Oil and Gas Journal, (Oct. 3, 1977), pp. 79–85; and SPE/DOE 9826, "Polymer Augmented Water-flooding at the West Yellow Creek Field: Recovery and Cost Experience", which are hereby incorporated by reference.

Polymer solution rate control devices of the prior art cannot detect and record flow rates of polymer solutions which they service. Therefore, present secondary and tertiary oil recovery operations require the additional expense and complication of a suitable metering means that will not significantly damage shear sensitive polymer solutions.

The disadvantages of prior art are overcome by the present invention which provides an improved apparatus and method for controlling and metering the flow rate of a liquid with a substantial upstream and downstream pressure differential across the device without causing significant shear stresses to act on the controlled liquid which is conveyed therethrough.

SUMMARY OF THE INVENTION

In a preferred embodiment of the present invention, there is an apparatus and a method for controlling the flow of a liquid. The apparatus and the method may cause a substantial pressure differential in the liquid without significant shear stresses acting on the controlled liquid.

A volume of control liquid or (controlling liquid), such as water, aqueous solutions of glycols or of glycerin, hydrocarbon oils, synthetic oils or the like, is contained within a control conduit which includes a first displacement chamber, a second displacement chamber, and a conduit flow control means. The control liquid is prevented from flowing from the first displacement chamber by a first barrier means which is located in the first displacement chamber of the control conduit. The control liquid is also retained in said second displacement chamber of the control conduit by a second barrier means. The two barrier means are disposed on opposite sides of the volume of control liquid and comprise movable surfaces for confining the control liquid while allowing the control liquid to flow through the conduit flow control means and through other parts of the control conduit between the movable first and second barrier means. The conduit flow control means provides direct control of the flow of the control liquid through the control conduit.

The first displacement chamber and the second displacement chamber of the control conduit also communicate with flow directing means for alternately introducing a volume of controlled liquid at relatively high pressure into one end of the control conduit with simultaneous egress of a volume of controlled liquid at relatively lower pressure from the other end of the control conduit and into a discharge conduit connected to said apparatus. In one position of the flow directing means, pressurized controlled liquid may be introduced into the first displacement chamber of the control conduit. Pressure is transmitted to the control liquid through the first barrier means. The control liquid may then flow through the control conduit at a rate that is determined by the conduit flow control means. Pressure is transmitted from the control liquid through the second barrier means to the portion of controlled fluid in communication with the discharge conduit, causing the controlled liquid to flow out of the second portion of the control conduit at the rate that the control liquid flows in the apparatus. Once the first and the second barrier means have reached a desired displacement, the flow directing means may be used to introduce pressurized controlled fluid into the second displacement chamber of the control conduit and allow egress of the controlled fluid previously introduced to the first displacement chamber of the control conduit until another desired displacement of the first and the second barrier means has been reached. This cycle may be repeated to allow substantially continuous flow of controlled liquid at a predetermined rate.

It is a feature of the present invention to provide flow rate control means for controlling flow of liquid at a substantial pressure differential without subjecting the controlled liquid to significant shear stresses.

It is another feature of the present invention to provide positive displacement, essentially shear-free means for pressure drop flow control and metering of shear sensitive liquids.

Still another feature of the present invention is to provide a means for accurate metering of liquid flow without subjecting the liquid to significant shear stress.

Yet another feature of the present invention is to provide an essentially shear-free means for adjustable flow rate control of a liquid.

These and other features and advantages of the present invention will become apparent from the following detailed description, wherein reference is made to the figures in the accompanying drawings.

IN THE DRAWINGS

DETAILED DESCRIPTION

Figure 1:
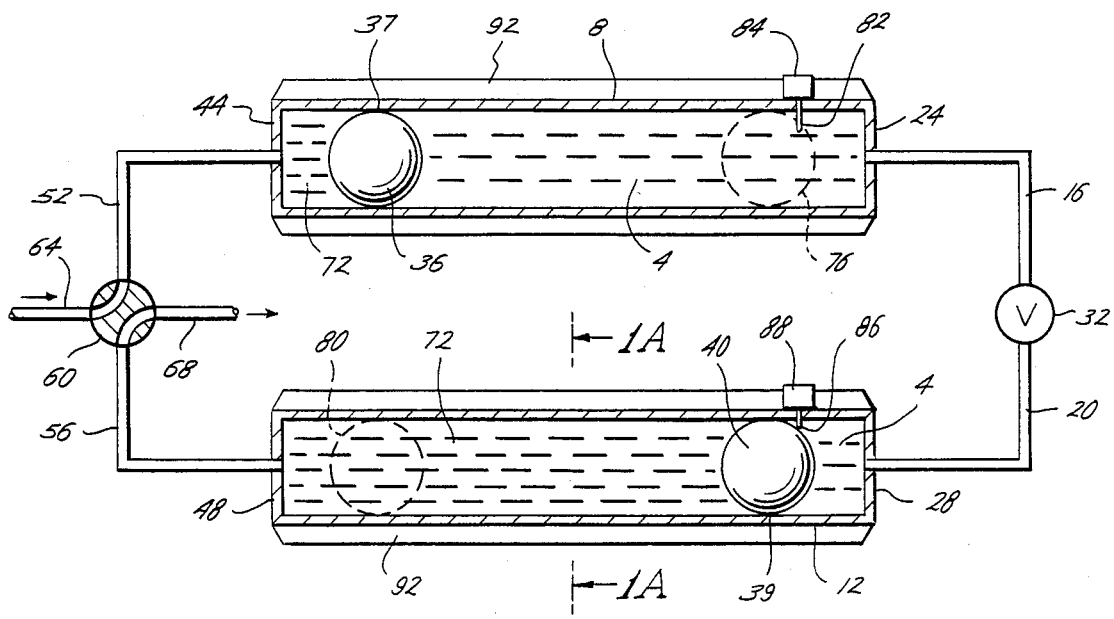
FIG. 1 is a schematic diagram of a preferred embodiment of a flow rate controller of the present invention.
Figure 1A:
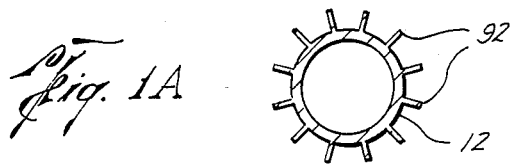
FIG. 1A is a sectional view of a portion of the preferred embodiment depicted in FIG. 1.

Referring first to FIG. 1, there may be seen a schematic diagram of a preferred embodiment of the present invention. Liquid 4 serves as a control liquid and is a substantially non-compressible liquid such as water, hydraulic oil, and the like. This control liquid should be non-corrosive and compatible with the seal and barrier members it contacts; it is also presently preferred that the liquid be selected to be shear stable and have a relatively low viscosity.

In the apparatus of FIG. 1, liquid 4 is disposed within a control conduit comprising cylindrical displacement chambers 8 and 12 as well as pipe 16, valve 32 and pipe 20 which are in communication therewith. Pipe 16 is connected with chamber 8 at chamber end 24 and, similarly, pipe 20 is connected with chamber 12 at chamber end 28. The other ends of pipes 16 and 20 communicate through valve 32. Liquid 4 may therefore flow out of chamber 8 at chamber end 24 through pipe 16, valve 32 and pipe 20 into chamber 12 at chamber end 28.

Valve 32 preferably is a conventional flow rate control valve adapted to maintain a constant rate of flow with variable pressure differentials across the valve; however, any means for controlling the flow rate of the control liquid is within the scope of the present invention. For instance, an orifice plate, various manually adjustable throttle valves, and the like may be used as valve means 32 in the practice of the present invention.

Spheres 36 and 40 function as movable barriers which sealably contain liquid 4 while allowing its flow between communicating chambers 8 and 12. In the embodiment of FIG. 1, displacement chambers 8 and 12 are cylindrical, each having a substantially constant interior diameter suitable to slidably accept spheres 36 and 40, respectively. More specifically, the clearance between sphere 36 and chamber 8 and the clearance between sphere 40 and chamber 12 should be established to provide snug peripheral contact with the inside wall surface of chambers 8 and 12 to prevent significant leakage of liquid in either direction past spheres 36 and 40 while allowing said spheres to slide throughout the length of their respective chambers 8 and 12.

Although the movable barriers depicted in the preferred embodiment shown in FIG. 1 are substantially spherical in the absolute sense, spheroids in general could be utilized instead and are contemplated by the present invention. Preferably, such spheroids are made of a material such as VITON TM which is synthetic rubber derived from the combination of vinylidine fluoride and hexafluoroproylene made by E. I. DuPont DeNemours & Co., however, many other suitable natural and synthetic materials which are known in the art may be used for these spheres. Suitable materials are deformable and elastic so that spheroids made from such materials should produce a better seal in their respective displacement chambers.

Still referring to FIG. 1, the present invention further includes a flow directing means for alternating between a first position to introduce a pressurized fluid through end 44 of chamber 8 and simultaneously allow egress of fluid through end 48 of chamber 12, and a second position to introduce a pressurized fluid into end 48 of chamber 12 and simultaneously allow egress of fluid from end 44 of chamber 8. The flow directing means comprises pipe 52 which communicates with both valve 60 and end 44 of chamber 8, pipe 56 which communicates with both valve 60 and end 48 of chamber 12, supply pipe 64 which communicates with a pressurized liquid source and valve 60, and discharge pipe 68 which communicates also with valve 60. Other conventional embodiments of alternating flow directing means are known in the art and may be used within the scope of the present invention.

A preferred embodiment of valve 60 is a conventional 4-way valve which is shown in one of its two operating positions in FIG. 1. In the position depicted, pressurized liquid flowing into valve 60 from supply pipe 64 is channeled into pipe 52 which directs the pressurized liquid 72 into end 44 of chamber 8. Simultaneously, the portion of liquid 72 in chamber 12 is caused by valve 60 to discharge through pipe 56 into discharge pipe 68. In its alternate operating position, valve 60 would direct pressurized liquid from supply pipe 64 into pipe 56 while simultaneously allowing fluid to flow from pipe 52 into discharge pipe 68. Valve 60 may be controlled either manually or automatically by hydraulic, pneumatic, electric, or other similar types of actuation.

The embodiment shown in FIG. 1 is adapted for liquid flow rate control under conditions which may result in relatively large fluid pressure drops without subjecting the controlled fluids to significant shear stress. High pressure liquid 72 from pipe 52 may be introduced into chamber 8 at end 44. The pressure of liquid 72 forces sphere 36 against liquid 4 in chamber 8 so that liquid 4 in both chamber 8 and pipe 16 is pressurized to substantially the same pressure as liquid 72. Sphere 36 is adapted to slide from its initial position 37 through chamber 8 while serving as a barrier separating liquid 72 from liquid 4. Valve 32 is used to directly control the rate of flow of liquid 4 (which serves as the control liquid) into chamber 12 through pipes 16 and 20.

As previously noted, conventional flow rate control means are often used under conditions which cause a relatively great and sudden pressure drop in the fluid flowing therethrough, and such pressure drop, referred to as high pressure gradient, subjects the fluid to substantial shear stressing. Liquid 4 in FIG. 1 is the only fluid in the flow rate controller of the present invention to be directly controlled by valve 32, therefore only liquid 4 will experience a high pressure gradient or the attendant shear stressing.

The pressure of liquid 4 in displacement chamber 12, which may be substantially less than the pressure of liquid in chamber 8, acts upon sphere 40 pressing it against the low pressure liquid 72 in communication with the discharge conduit 68. Thus, liquid 72 in chamber 12 is pressurized to substantially the equivalent pressure of fluid 4 in chamber 12. Sphere 40 can slide through chamber 12 while separating liquid 4 from liquid 72 so that liquid 72 will flow out of end 48 of chamber 12, through pipe 56 and valve 60, into discharge pipe 68.

Liquid 72 in FIG. 1 represents volumes of liquid which are introduced to displacement chambers 8 and 12 from supply pipe 64 and it is sometimes referred to as the controlled liquid. Note that liquid 72 will discharge through discharge pipe 68 at essentially the same flow rate as the flow rate of liquid 4 from chamber 8 to chamber 12. Therefore, the flow rate of liquid 4 determines or controls the flow rate of liquid 72 through discharge conduit 68. At the same time, only liquid 4 is directly controlled by valve 32 so that controlled liquid 72 is not subjected to any shear stressing by valve 32.

As control liquid 4 continues to flow from chamber 8 into chamber 12, spheres 36 and 40 will move from their respective initial positions 37 and 39 to position 76 (as shown by circular broken line) in chamber 8 and position 80 (as shown by circular broken line) in chamber 12, respectively. At this time, valve 60 will normally be switched to its alternate position so that supply pipe 64 communicates with pipe 56 through valve 60 and pipe 52 communicates with discharge pipe 68 through valve 60 also. Thereby, pressurized liquid from supply pipe 64 may be introduced into end 48 of chamber 12, which will cause liquid 4 to flow through end 24 of chamber 8 at a rate controlled by valve 32, resulting in a controlled flow rate from chamber 8 of liquid 72 from end 44 of chamber 8 into discharge pipe 68. This flow will be continued until spheres 36 and 40 return to their original positions 37 and 39 near chamber ends 44 and 28, respectively, at which time valve 60 may be switched back to its first position, as shown in FIG. 1. By switching valve 60 from one alternate position to the other in proper sequence, as previously discussed, substantially continuous flow of fluid to discharge pipe 68 may be maintained at a desired flow rate.

Positive displacement metering characteristics of the present invention may be utilized by incorporating means for indicating a predetermined displacement of the movable barrier means, that is, means for indicating the displacement of spheres 36 and 40 of the embodiment shown in FIG. 1. Barrier displacement indicating means are incorporated with the preferred embodiment shown in FIG. 1 and include indicators 84 and 88 for indicating the activation of sensor elements 82 and 86, respectively. Indicators 84 and 88 are disposed in a visable location on the exterior surface of respective chambers 8 and 12 close to chamber ends 24 and 28. Sensor elements or pins 82 and 86 extend from corresponding indicators 84 and 88, through the wall of respective chambers 8 or 12 and into the corresponding chamber cavity. As sphere 36 or 40 approaches the location of indicator 84 or 88, respectively, the sphere's surface will cause the depression of sensor pin 82 or 86, thereby allowing the visual, electric or hydraulic indication of its presence by means such as indicators 84 or 88. Other displacement indicating means are known in the art and the use thereof to indicate barrier displacement is within the scope of the present invention.

FIG. 1 shows sensor pin 82 in its fully extended position while sphere 36 is at end 44 of chamber 8. However, when sphere 36 reaches position 76 in chamber 8, sensor pin 82 will be depressed similarly to the depression of sensor pin 86 by sphere 40 in its position 39 in chamber 12 as shown in FIG. 1.

Still referring to FIG. 1, indicators 84 and 88 may be used to determine the flow rate of liquid 72 through the apparatus. The volume of liquid 4 that is trapped between spheres 36 and 40 should remain substantially constant during normal operation of the apparatus so that whenever sensor pin 86 is depressed by sphere 40, as is shown in FIG. 1, sphere 36 will be located substantially at position 37 depicted in FIG. 1. Similarly, whenever sensor pin 82 is depressed by sphere 36 at position 76, sphere 40 will be located substantially at position 80.

Cylindrical chambers 8 and 12, in FIG. 1, are each of substantially uniform diameter. Therefore, the volume of liquid 4 flowing into or out of chambers 8 and 12 for each full travel displacement of barriers 36 and 40 may be calculated by determining the lateral displacement of spheres 36 and 40 within their respective displacement chambers 8 and 12 and computing the volume of liquid flowing as a result of those sphere movements or the volume displaced by a full travel displacement of each sphere may be determined by direct volumetric calibration of the apparatus in correlation with the displacement of spheres 36 and 40.

The displacement of spheres 36 and 40 may be determined accurately for use in metering determinations during continuous apparatus operation by the use of indicators 84 and 88 after calibration of the apparatus. Such calibration is typically accomplished by determining through testing or otherwise the volume of liquid 72 egressing from chamber 8 through end 44 when sphere 36 travels from position 76 to position 37 (the position shown in FIG. 1) and the volume of liquid 72 egressing from chamber 12 through end 48 when sphere 40 travels from position 39 shown in FIG. 1 to position 80. After calibrating the apparatus, an accurate determination may be obtained of the volume of liquid that has been discharged into discharge pipe 68 by the apparatus for the number of full travel displacement movements of spheres 36 and 40 occurring during a particular time period. Known calibration techniques that are applicable to positive displacement metering devices are applicable to this feature of the present invention.

Preferably, switching of valve 60 from one alternate position to the other in sequence as spheres 36 and 40 reach their respective positions 76 and 39, as determined by indications from indicators 84 and 88, is coordinated with the foregoing utilization of the positive displacement metering capabilities of the present invention. When indicator 88 indicates the presence of sphere 40 at the position shown in FIG. 1, valve 60 should be switched so that liquid 72 from supply pipe 64 is directed into end 44 of chamber 8 and liquid 72 is channeled from end 48 of chamber 12 into discharge pipe 68. When indicator 84 indicates the presence of sphere 36 at position 76, sphere 40 should be disposed at position 80 in chamber 12, therefore a volume of liquid 72, which may be determined by the aforementioned calibration, will have been discharged from chamber 12 through discharge pipe 68. At approximately the time of such indication by indicator 84, valve 60 should be switched so that liquid from supply pipe 64 is directed into end 48 of chamber 12 and liquid is channeled from end 44 of chamber 8 into discharge pipe 68. When indicator 88 indicates the return of sphere 40 to the position shown in FIG. 1, sphere 36 will have also returned to the position shown in FIG. 1, therefore a calibrated volume of liquid 72 will have then been discharged from chamber 8 into discharge pipe 68. The aforementioned procedure may be repeated for as long as desired to yield a substantially continuous flow of fluid. The volume of liquid that is discharged through discharge pipe 68 during a selected time period may be determined by totaling the known volume of liquid egressing from chambers 8 and 12 for each full travel displacement of the barriers for each movement. Such volume totaling is preferably accomplished by counting the number of position or contact indications from indicators 84 and 88 by mechanical or electronic means.

Energy dissipated by the repeated shearing of liquid 4 by valve 32 may cause a substantial increase in the temperature of liquid 4. Various conventional heat transfer enhancing means may be incorporated with the control conduit. The preferred embodiment illustrated in FIG. 1 includes, for example, means for enhancing heat transfer from liquid 4 which comprises a plurality of heat transfer fins 92 which run longitudinally along the exterior surfaces of chambers 8 and 12. Thereby, heat from liquid 4 may be transferred through the walls of chambers 8 and 12, through heat transfer fins 92, and into the surrounding atmosphere at an increased rate. Heat transfer fins 92 are preferably made of a material having high thermal conductivity.

FIG. 1-A is a sectional view of Chamber 12 which shows, by way of illustration, heat transfer fins 92, which are of a conventional type. Heat transfer fins such as fins 92 may be used as shown not only for Chamber 12 in FIG. 1 and for Chamber 8 of FIG. 1 as well. Preferably, heat transfer fins 92 extend radially from the exterior surface of the chamber to which they are affixed. Such fins are illustrative of conventional heat transfer means and they may be used for the chambers or other conduit members of other embodiments of the present invention with suitable adjustments of size, number, and configuration as may be determined to be desirable by methods known to persons familiar with the design of heat transfer apparatus.

Figure 2:
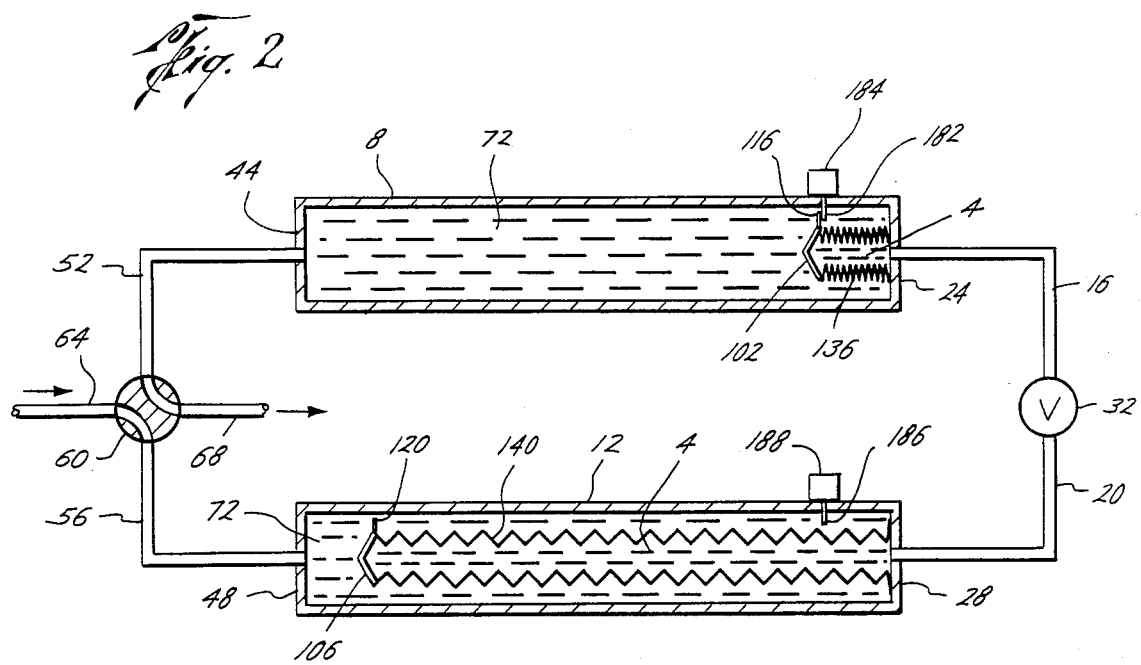
FIG. 2 is a schematic diagram of an embodiment of a flow rate controller of the present invention in which bellows are used as liquid retaining barriers.

Referring now to FIG. 2, there is depicted another embodiment of the present invention which is substantially the same as the embodiment shown in FIG. 1, with the exception of the movable barrier means which comprises bellows 136 and 140, the barrier displacement indicating means which includes indicators 184 and 188, sensor switches 182 and 186, and trippers 116 and 120. Because the remainder of the elements are substantially identical, in structure and function, to the embodiment of FIG. 1, such elements are identified by the same numbers as in FIG. 1. Furthermore, the prior discussion of those elements with reference to FIG. 1 is applicable to FIG. 2 and the discussion of FIG. 1 may be referred to in this connection.

Cylindrical bellows 136 and 140 are each affixed and sealed at one end to chamber ends 24 and 28, inside chambers 8 and 12, respectively, so that pipes 16 and 20 will communicate with respective bellows 136 and 140. Bellows ends 102 and 106 are left free to move along the length of corresponding chambers 8 and 12 as bellows 136 and 140 expand. The sizing of bellows 136 and 140 is preferably sufficient for their retraction in one instance to fill only a relatively small volume of corresponding chambers 8 and 12 and their expansion to fill a relatively large volume of chambers 8 and 12 in another instance.

Bellows 136 and 140 serve as alternate embodiments of the movable barrier means and, therefore, function similarly to spheres 36 and 40 in FIG. 1. With valve 60 in the position shown in FIG. 2, pressurized liquid 72 from supply pipe 64 will be introduced into chamber 12 through end 48 while liquid 72 in chamber 8 will be allowed to egress through end 44 into discharge pipe 68. Liquid 4, which is contained in chambers 8 and 12 by respective bellows 136 and 140, may flow from chamber 12 at end 28 into chamber 8 at end 24, due to the pressurization of chamber 12 by liquid 72, at a rate controlled by valve 32. As this occurs, bellows 140 may retract so that bellows end 106 approaches end 28 of chamber 12. Simultaneously, bellows 136 expands so that bellows end 102 approaches end 44 of chamber 8, forcing liquid 72 into discharge pipe 68 at essentially the same flow rate as that of liquid 4 through the conduit flow control valve 32. Egress of liquid 72 from chamber 8 into discharge pipe 68 is therefore controlled by valve 32 which is in direct control of the flow rate of liquid 4.

Positive displacement metering characteristics of the present invention may be utilized by the embodiment shown in FIG. 2. The displacement of bellows ends 102 and 106 from their fully retracted positions will correlate directly with the volume of liquid 72 which will be displaced in chambers 8 or 12 by liquid 4 during normal operation of the apparatus. Conventional calibration techniques may be employed, as previously discussed with reference to FIG. 1, to establish such a correlation.

Indicators 184 and 188 serve as means for indicating the displacement of corresponding bellows ends 102 and 106, respectively. Trippers 116 and 120, which are disposed on corresponding bellows ends 102 and 106, signal respective indicators 184 and 188 of the full retraction of bellows 136 and 140 by contacting sensor elements such as switches 182 and 186. As discussed previously, the volume of liquid 4 will remain substantially constant during normal apparatus operation so that when either indicator 184 or 188 indicates the full retraction of bellows 136 or 140 (e.g., bellows 136 in FIG. 2) a certain volume of liquid, which can be determined by the aforementioned calibration techniques, will be discharged through discharge pipe 68. Therefore, the total volume of liquid discharged through discharge pipe 68 during a period of time may be determined by counting indications from indicators 184 and 188, which represents discrete volumes of liquid discharged from chambers 8 and 12, during such period of time.

Figure 3:
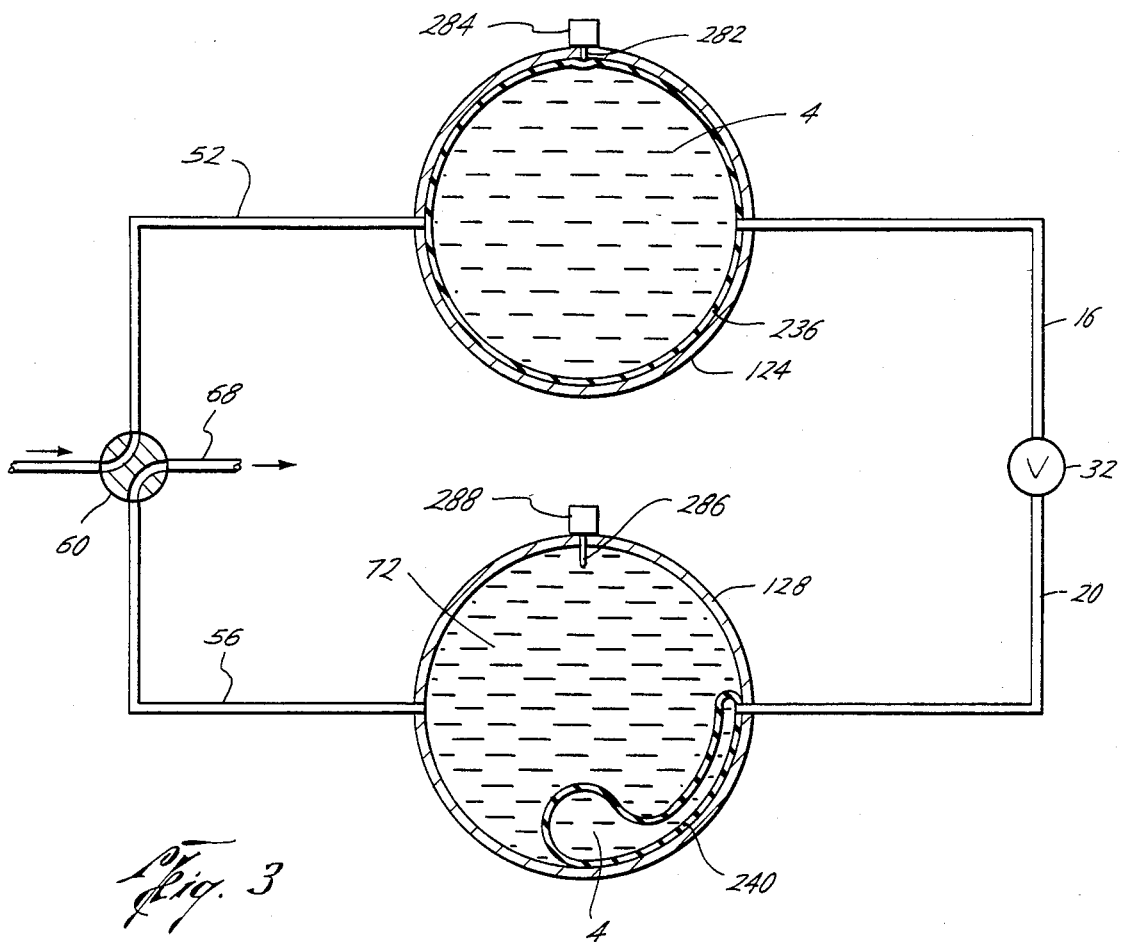
FIG. 3 is a schematic diagram of another embodiment of a flow rate controller of the present invention in which flexible bladders are utilized as liquid barriers.

Now referring to FIG. 3, yet another embodiment of the present invention is depicted which is substantially the same as the embodiment shown in FIG. 1, with the exception of the movable barrier means which comprises bladders 236 and 240, the barrier displacement indicating means which includes indicators 284 and 288 and sensor switches 282 and 286, and control conduit which in part comprises spherical displacement chambers 124 and 128. The remainder of the elements are substantially identical, in structure and in function, to the embodiment of FIG. 1, and such elements are identified by the same numbers as in FIG. 1.

Bladders 236 and 240, which are disposed within respective spherical chambers 124 and 128, communicate with pipes 16 and 20, respectively. They are flexible and sized appropriately so that they may substantially fill chambers 124 and 128 when filled with liquid 4. Thereby, liquid 4 may flow between chambers 124 and 128 while being separated from the volume of controlled liquid 72 in those chambers.

Indicators 284 and 288 may be used to determine the flow rate of liquid into discharge pipe 68 during a period of time. Sensor pins 282 and 286 sense the full expansion of corresponding bladders 236 and 240 which results in activation of indicators 284 and 288. When bladders 236 and 240 expand fully from their fully contracted state, a certain volume of liquid which may be determined by the aforementioned calibration techniques will be discharged through discharge pipe 68.

Figure 4:
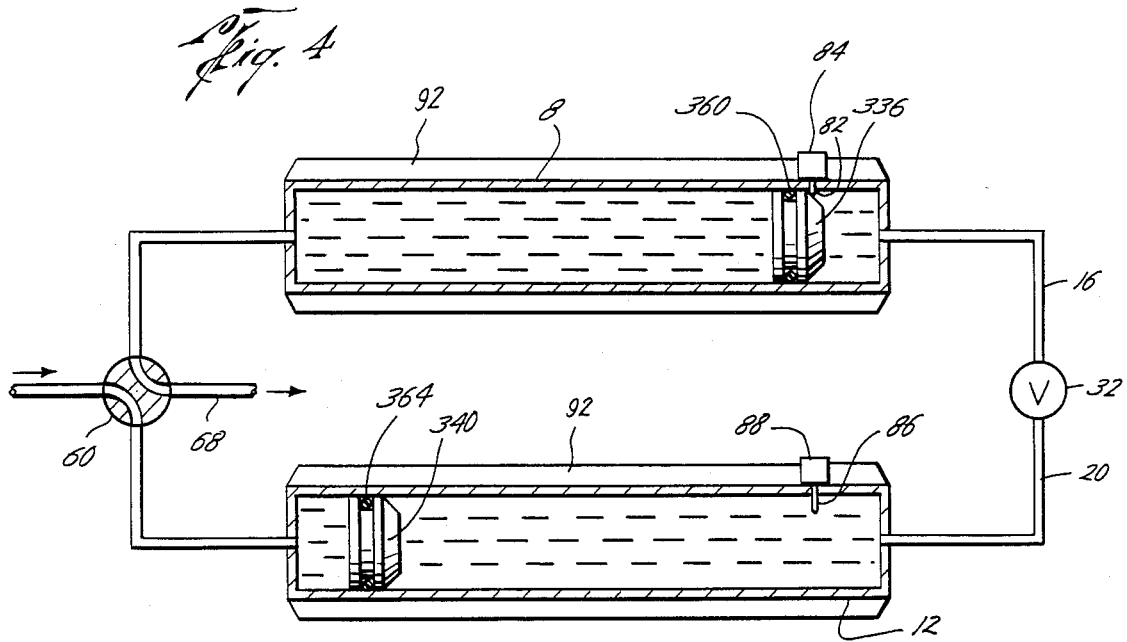
FIG. 4 is a schematic diagram of still another preferred embodiment of the present invention in which pistons are provided as liquid retaining barriers.

Turning now to FIG. 4, another embodiment of the present invention is illustrated in which the movable barrier means comprises circular pistons 336 and 340. Pistons 336 and 340 contain liquid 4 within the control conduit while allowing liquid 4 to flow between chambers 8 and 12 at a rate controlled by valve 32. O-rings 360 and 364 serve as means for creating a slidable peripheral seal between respective pistons 336 and 340 and corresponding chambers 8 and 12. Thereby, pistons 336 and 340 may slide freely within chambers 8 and 12, respectively, while separating liquid 72 from liquid 4.

The determination of the flow rate of fluid discharged through discharge pipe 68 may be made by utilizing indictors 84 and 88 in combination with respective sensor pins 82 and 86, which operate in a manner substantially identical to that described with reference to FIG. 1. Techniques for utilizing indicators 84 and 88 in conjunction with pistons 336 and 340 are substantially identical to those described with reference to spheres 36 and 40 of FIG. 1.

Figure 5:
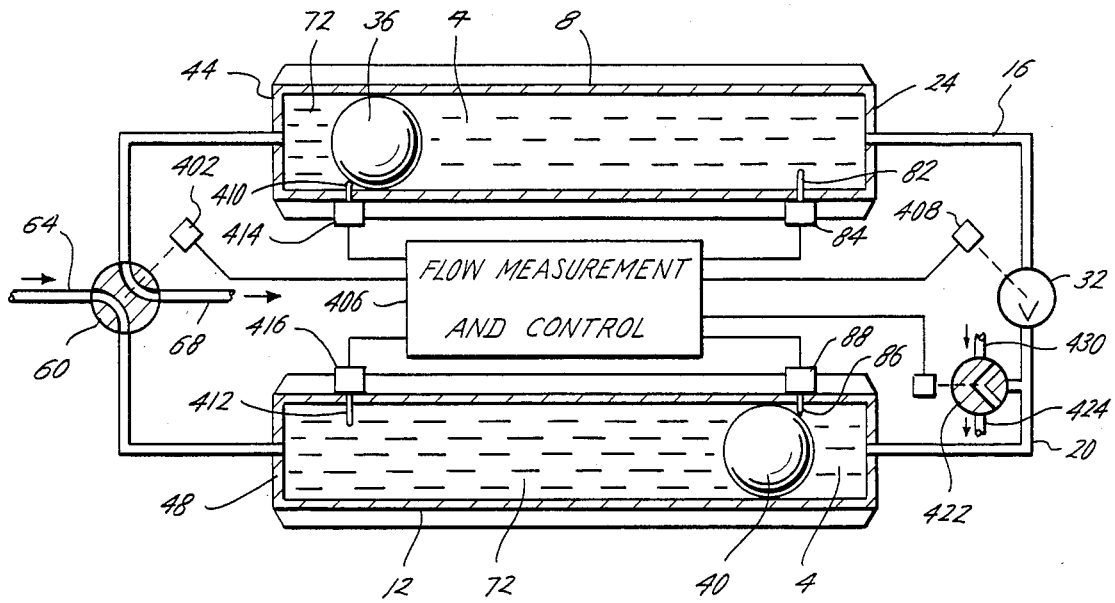
FIG. 5 is a schematic diagram of another embodiment of the present invention with preferred automatic flow control and measurement equipment.

FIG. 5 depicts an improvement of the embodiment shown in FIG. 1. The improvements incorporated with the embodiment shown in FIG. 5 include means 402 for automatically switching valve 60 upon activation of said switching means 402 by control means 406. Control means 406 may be any conventional control means known in the art such as a suitably programmed microprocessing controller. Valve 60 may thereby be moved from one alternate position to the other in sequence with the displacement of spheres 36 and 40. The means 406 functions with sensing means 82 and 86 and with flow switching control device 402 to compute and record the volume of controlled liquid 72 discharged through discharge pipe 68 during a full displacement (or other desired displacement) of volume of liquid 4 in the apparatus. The flow measurement and control means 406 also may be utilized to activate and control valve 35 control means 408 to constantly maintain the desired flow rate of liquid 4 through valve 32.

As previously noted, liquid 4 should be selected to be compatible with the apparatus. However, it is recognized that from time to time the volume of liquid 4 contained in the control conduit may require adjustment by injecting or removing a portion of liquid 4 in the conduit. This function can be incorporated in the automatic control device 406 whereby sensors 410 and 412 of the indicator means 414 and 416, respectively, provide an indication as to the full travel displacement of spheres 36 and 40 adjacent ends 44 and 48 of chambers 8 and 12, respectively. Coupled with the sensors 82 and 86, means can be incorporated in the flow measurement and control device 406 whereby any premature contact by sphere 36 or sphere 40 will automatically indicate a need for adjustment of liquid 4 in the conduit. For example, in FIG. 5 if sphere 36 were in the position shown, and sphere 40 had failed to make full travel movement to contact sensor 86, it would be apparent that because of expansion, leakage or other causes, the volume of liquid 4 would need reduction by removing sufficient liquid to cause sphere 40 to complete its travel so as to contact sensor 86. Upon sensing this condition, the flow measurement and control apparatus 406 may be caused to activate two-way valve 422 whereby liquid 4 is discharged through conduit 424 until the desired contact between sphere 40 and sensor 86 is achieved, at which point valve 422 is automatically returned to the cut-off position as shown in FIG. 5.

On the other hand, if sphere 40 were to contact sensor 86 prior to the contact of sensor 410 by sphere 36, it would be apparent that additional liquid 4 should be added to the conduit to cause simultaneous contact of sensor 410 and sensor 86 by spheres 36 and 40, respectively. This can automatically be accomplished by the flow measurement and control apparatus 406 by programming it to change the position of valve 422 whereby sufficient additional fluid is caused to flow through fluid 4 supply pipe 430 into conduit 20 until the sphere 36 contacts sensor 410.

It will be apparent that the automatic adjustment of the control liquid volume as previously described is not dependent upon the indicated position of valve 60 directing flow of pressurized liquid into chamber 12. This volume adjustment can be made with valve 60 in the position shown in FIG. 1; however, the travel of the barriers 36 and 40 will be reversed and, for this alternate position of valve 60, sensor pin 412 will function to determine full travel movement of barrier 40 in chamber 12 and sensor pin 82 will indicate full travel movement of barrier 36 in chamber 8.

To prevent continued flow of fluid 72 during the foregoing control liquid adjustments, a cut-off valve may be installed in line 64 or, preferably, four-way valve 60 may be automatically turned to a cut-off position by the flow control apparatus 406 during all automatic volume adjustments of liquid 4 in the conduit.

Figure 6:
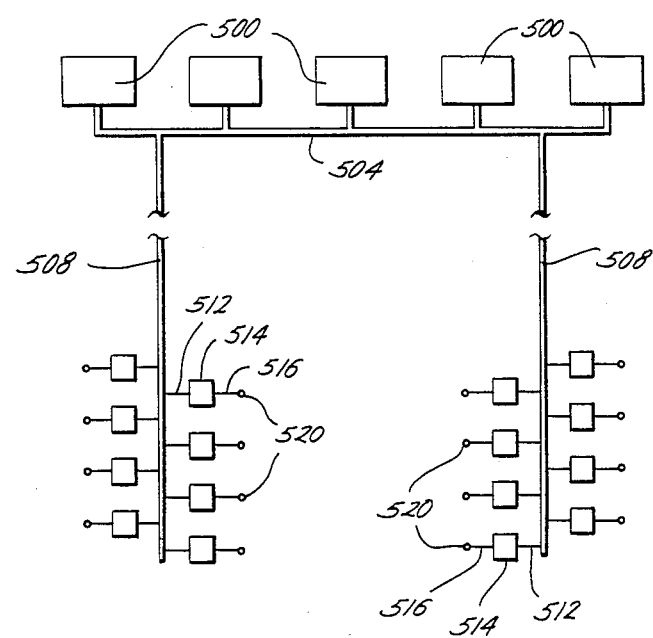
FIG. 6 is a schematic diagram illustrating a possible application of the present invention to secondary or tertiary oil recovery.

FIG. 6 illustrates the specific application of the present invention to polymer solution flow rate control in secondary and tertiary oil recovery flooding operations. In this use of the present invention, positive displacement pumps 500 supply a pressurized polymer solution to flow lines 508 through manifold 504. Flow lines 508 deliver the pressurized polymer solution to the desired oil field where input wellheads 520 are located. Supply lines 512 each channel the pressurized polymer solution to a flow rate control and metering device 514 which comprises a suitable embodiment of the present invention. The flow rate control and metering devices 514, in turn, may provide substantially continuous, adjustable high pressure drop flow rate control and metering of the polymer solution without subjecting the polymer solution to substantial shear stressing. Finally, the polymer solution may be discharged from flow rate control and metering devices 514, at the desired flow rate through discharge pipes 516, into input wellheads 520.

It is therefore apparent that the present invention is one well adapted to obtain all of the advantages and features hereinabove set forth, together with other advangtages which will become obvious and inherent from a description of the apparatus itself. It will be understood that certain combinations and subcombinations are of utility and may be employed in various flow control or metering applications without reference to other features and subcombinations. This is contemplated by and is within the scope of the present invention.

What is claimed is:

1. In a system having a high pressure pumping means for injecting a viscous shear-sensitive liquid into a subsurface earth formation, an adjustable flow controller for establishing such injection at a preselected flow rate against a variable rock pressure in said formation, said flow controller comprising first chamber means having first and second ports and a displacement liquid therebetween, first barrier means responsive to said pumping means and disposed in said first chamber means for isolating said displacement liquid from said first port therein, second chamber means having third and fourth ports and a displacement liquid therebetween, second barrier means responsive to said pumping means and disposed in said second chamber means for isolating said displacement liquid from said fourth port therein, first adjustable valve means interconnecting said chamber means for selectively constricting the flow of said displacement liquid between said second and third ports therein as a function of said rock pressure in said formation, and second adjustable valve means interconnected with said pumping means and said formation for delivering said viscous liquid into said first chamber through said first port and from said second chamber through said fourth port and for alternately delivering said viscous liquid into said second chamber through said fourth port and from said first chamber through said first port.

2. The apparatus of claim 1, wherein said barrier means comprises a plurality of spheroids.

3. The apparatus of claim 1, wherein said barrier means comprises a plurality of bellows.

4. The apparatus of claim 1, wherein said barrier means comprises a plurality of bladders.

5. The apparatus of claim 1, wherein said barrier means comprises a plurality of pistons.

6. The apparatus of any one of claims 1 and 2 through 5, wherein said first valve means comprises an adjustable constant flow rate control valve.

7. The apparatus of any one of claims 1 and 2 through 5, wherein said first valve means comprises a throttle valve.

8. The apparatus of any of claims 2, 3, or 5, having in combination therewith sensing means adapted to detect a predetermined limit of displacement of the barrier means toward said first valve means and operative means connected to said sensing means to change automatically the flow from one said chamber means to the other when the predetermined limit of said displacement has been reached.

9. The apparatus of claim 8, wherein the volume of shear-sensitive liquid entering said formation is determined for each displacement move of each said barrier means and counter means is connected to said sensing means to count the times each said barrier means reaches the sensing means as a result of displacement movement toward said first valve means to measure thereby the flow of shear-sensitive liquid through said apparatus.

10. The apparatus of claim 9, further comprising timing means for recording the number of counted movements in a predetermined period to thereby provide the rate of flow of shear-sensitive liquid from the flow controller.

11. The apparatus of any one of claims 2, 3, or 5, having in combination therewith adjusting means for maintaining a constant volume of displacement liquid in said chambers and first valve means, said adjusting means including:

first sensing means to detect a predetermined full travel position of said first barrier means in said first chamber, second sensing means to detect a corresponding full travel position of said second barrier means in said second chamber means, means for introducing displacement liquid into said chambers for so long as said second barrier means does not reach its full travel position at the same time the first barrier means reaches its full travel position, and means for discharging displacement liquid from said chambers for so long as said second barrier means has reached its full travel position before the first barrier means has reached its full travel position.

12. The apparatus of claim 4, further comprising sensing means adapted to detect a predetermined limit of displacement of the barrier means by movement thereof away from said first valve means and operative means connected to said sensing means to change the flow of displacement liquid from one said chamber means to the other when the predetermined limit of said displacement has been reached.

13. The apparatus of claim 12, wherein the volume of displacement liquid passing between said chambers is determined for each displacement move of each said barrier means and counter means is connected to said sensing means to count the number of times each said barrier means reaches the sensing means as a result of displacement movement away from said first valve means to measure the flow of fluid through said apparatus.

14. The apparatus of claim 13, having in combination therewith timing means for recording the number of sensed movements in a predetermined period to thereby record the rate of flow of shear-sensitive liquid through the apparatus.

15. The apparatus of any one of claims 2, 3, 4, or 5, having in combination therewith heat dissipating fins on said chamber means.

16. A flow control method for a shear-sensitive polymeric liquid having a viscosity degradable in response to a pressure gradient above a predetermined value, said method comprising establishing and conducting said polymeric liquid along a first path, establishing and conducting a liquid along a second path isolated from and in response to said polymeric liquid in said first path, imposing a pressure gradient above said predetermined minimum value onto said liquid in said second path, and establishing and conducting said polymeric liquid along a third path isolated from and in response to said liquid in said second path at a flow rate functionally related to said imposed pressure gradient.

* * * * *